United States Patent
Kuo

(10) Patent No.: US 10,655,705 B2
(45) Date of Patent: May 19, 2020

(54) AUXILIARY ROPE KNOTTER

(71) Applicant: Xiamen Ontop Rubber Plastics & Hardware Inc., Co., Xiamen (CN)

(72) Inventor: Su-Min Kuo, Xiamen (CN)

(73) Assignee: XIAMEN ONTOP RUBBER PLASTICS & HARDWARE INC., CO., Xiamen (CN)

(*) Notice: Subject to any disclaimer, the term of this patent is extended or adjusted under 35 U.S.C. 154(b) by 0 days.

(21) Appl. No.: 16/162,587

(22) Filed: Oct. 17, 2018

(65) Prior Publication Data
US 2019/0285137 A1    Sep. 19, 2019

(30) Foreign Application Priority Data
Mar. 19, 2018   (CN) .......................... 2018 1 0224485

(51) Int. Cl.
*F16G 11/04* (2006.01)
*F16G 11/14* (2006.01)

(52) U.S. Cl.
CPC ............ *F16G 11/046* (2013.01); *F16G 11/14* (2013.01)

(58) Field of Classification Search
CPC ............................. F16G 11/046; F16G 11/14
See application file for complete search history.

(56) References Cited

U.S. PATENT DOCUMENTS

| | | | |
|---|---|---|---|
| 2006/0096067 A1* | 5/2006 | Fontaine | F16G 11/103 24/130 |
| 2011/0126382 A1* | 6/2011 | Kirkham | A61B 17/1322 24/16 R |
| 2012/0137475 A1* | 6/2012 | Seader | F16G 11/10 24/129 R |
| 2017/0108080 A1* | 4/2017 | Wheelwright | F16G 11/044 |

* cited by examiner

*Primary Examiner* — Robert Sandy
*Assistant Examiner* — David M Upchurch
(74) *Attorney, Agent, or Firm* — Alan D. Kamrath; Karin L. Williams; Mayer & Williams PC

(57) ABSTRACT

An auxiliary rope knotter includes an interior formed with a first through hole, a second through hole, a first locking groove and a second locking groove which are parallel with each other. In the cross-sectional face of the auxiliary rope knotter, the first center connecting line formed by the first through hole and the second through hole intersects the second center connecting line formed by the first locking groove and the second locking groove, such that the rope is easily knotted by the auxiliary rope knotter.

12 Claims, 3 Drawing Sheets

AUXILIARY ROPE KNOTTER

BACKGROUND OF THE INVENTION

1. Field of the Invention

The present invention relates to a rope (or cord) and, more particularly, to an auxiliary rope knotter.

2. Description of the Related Art

A rope, especially an elastic rope, is usually knotted itself to form a knot. Such a knot is knotted conveniently and has enhanced stability and rigidity. However, it is difficult to unknot the knotted rope, thereby greatly causing inconvenience to the user when needing to unknot the knotted rope.

BRIEF SUMMARY OF THE INVENTION

The primary objective of the present invention is to provide an auxiliary rope knotter that is operated easily and, conveniently.

In accordance with the present invention, there is provided an auxiliary rope knotter comprising an interior formed with a first through hole, a second through hole, a first locking groove and a second locking groove. The first through hole, the second through hole, the first locking groove and the second locking groove are parallel with each other. In a cross-sectional face of the auxiliary rope knotter, the first through hole and the second through hole have a first center connecting line, and the first locking groove and the second locking groove have a second center connecting line. The second center connecting line intersects the first center connecting line.

Preferably, in a cross-sectional face of the first locking groove and the second locking groove, each of the first locking groove and the second locking groove has an opening which has a width smaller than a width of each of the first locking groove and the second locking groove.

Preferably, each of the first locking groove and the second locking groove is formed with a first extension wall protruding outward and a second extension wall protruding outward. Tops of the first extension wall and the second extension wall are spaced from each other through a predetermined distance and form the opening.

Preferably, a rope is inserted through the opening into the first locking groove and the second locking groove, and the first extension wall and the second extension wall press the rope to increase a friction between the rope and an inner wall of each of the first locking groove and the second locking groove.

Preferably, each of the first locking groove and the second locking groove has two opposite ends each provided with a chamfered face.

Preferably, each of the first through hole and the second through hole has a diameter greater than or equal to that of the rope.

Preferably, the auxiliary rope knotter has an outer surface provided with a projection to enhance a handhold friction.

In accordance with the present invention, there is further provided a rope knotting method of the auxiliary rope knotter, comprising a first step of driving the rope to extend through the first through hole and the second through hole serially, and a second step of locking the rope, that passes the first through hole and the second through hole, into the first locking groove and the second locking groove serially.

Preferably, in the first step, the rope is formed with a bent portion between the first through hole and the second through hole after the rope serially extends through the first through hole and the second through hole. In the second step, the rope, that passes the first through hole or the second through hole is locked between the bent portion of the rope and the auxiliary rope knotter.

According to the primary advantage of the present invention, in the cross-sectional face of the auxiliary rope knotter, the first center connecting line formed by the first through hole and the second through hole intersects the second center connecting line formed by the first locking groove and the second locking groove, such that the rope is easily knotted by the auxiliary rope knotter, thereby facilitating the user operating the auxiliary rope knotter to knot the rope, and thereby enhancing the safety of operation.

According to another advantage of the present invention, in the cross-sectional face of the first locking groove and the second locking groove, the width of the opening of each of the first locking groove and the second locking groove is smaller than the width of each of the first locking groove and the second locking groove, such that the rope is securely locked in the first locking, groove and the second locking groove.

According to a further advantage of the present invention, when the rope is inserted through the opening into the first locking groove 30 and the second locking groove, the first extension wall and the second extension wall press the rope to increase the friction between the rope and the inner wall of each of the first locking groove and the second locking groove, thereby enhancing the structural stability of the auxiliary rope knotter.

According to a further advantage of the present invention, each of the first locking groove and the second locking groove has two opposite ends each provided with a chamfered face, such that the rope is inserted into or detached from the first locking groove and the second locking groove easily an conveniently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
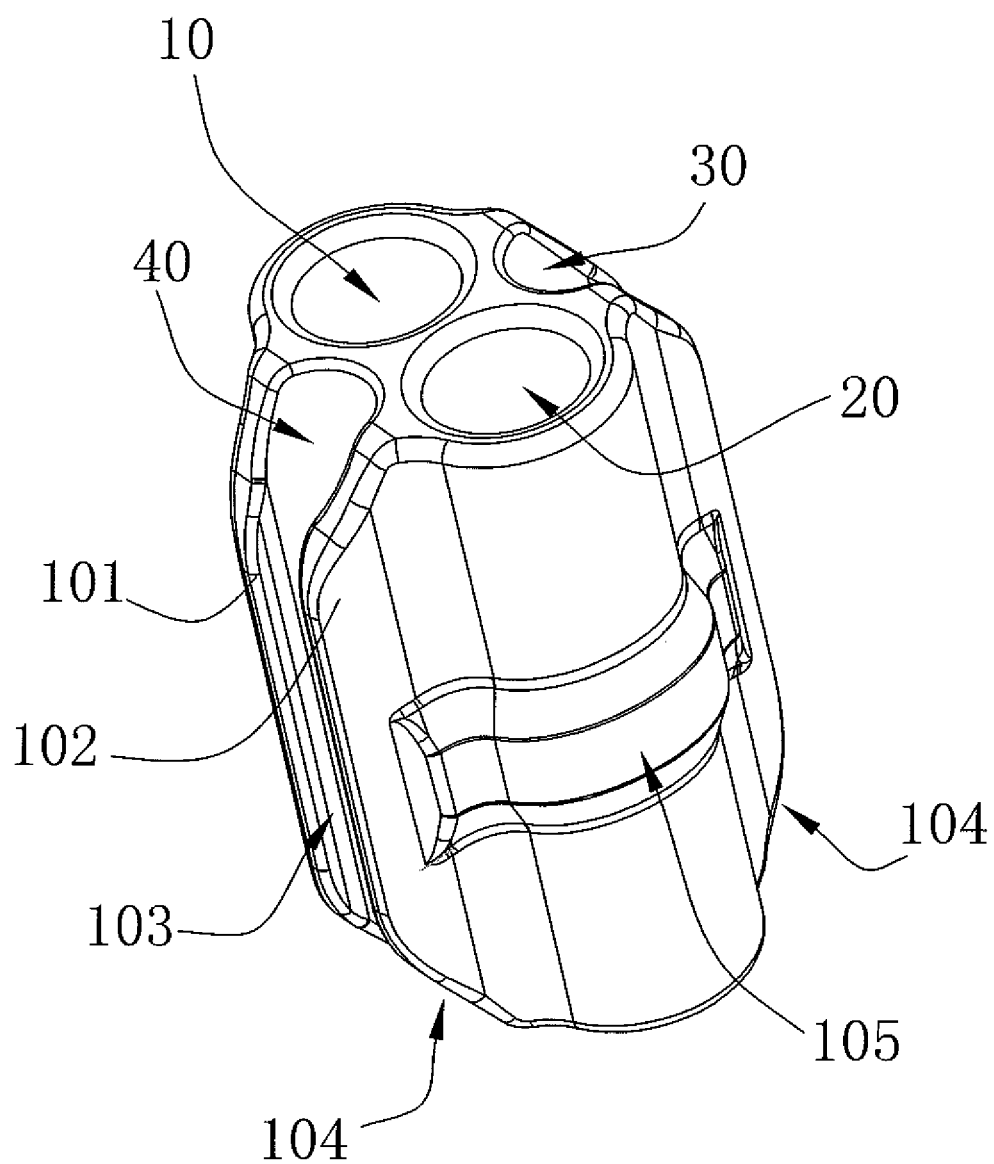
FIG. 1 is a perspective view of an auxiliary rope knotter in accordance with the preferred embodiment of the present invention.
Figure 2:
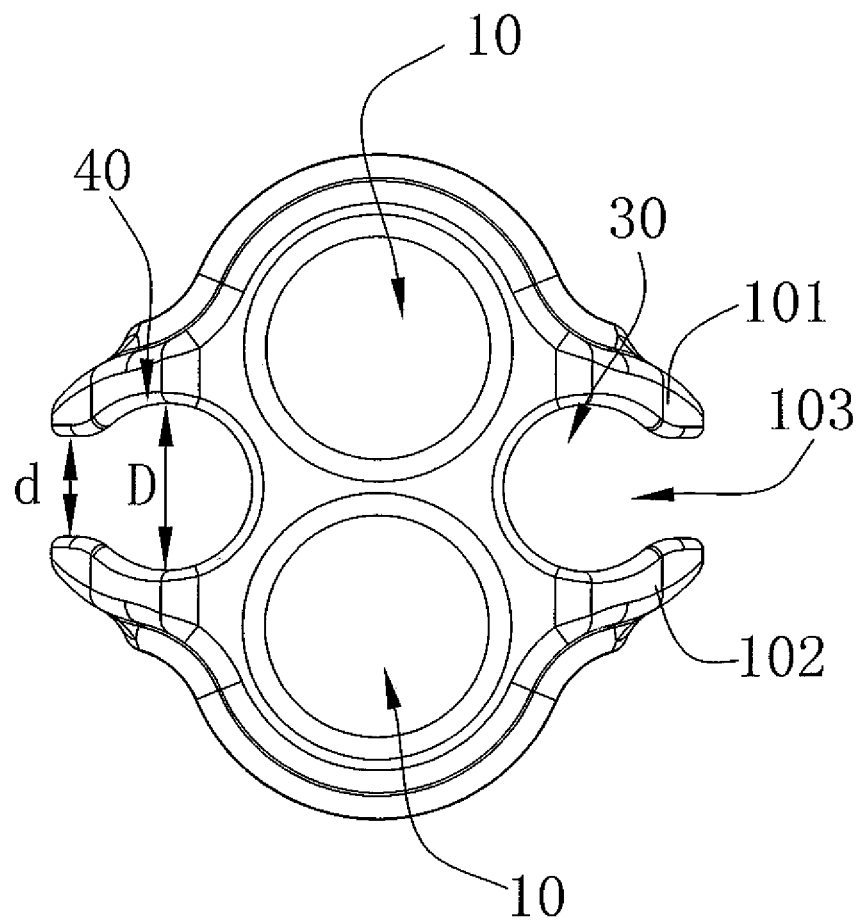
FIG. 2 is a top view of the auxiliary rope knotter in accordance with the preferred embodiment of the present invention.
Figure 3:
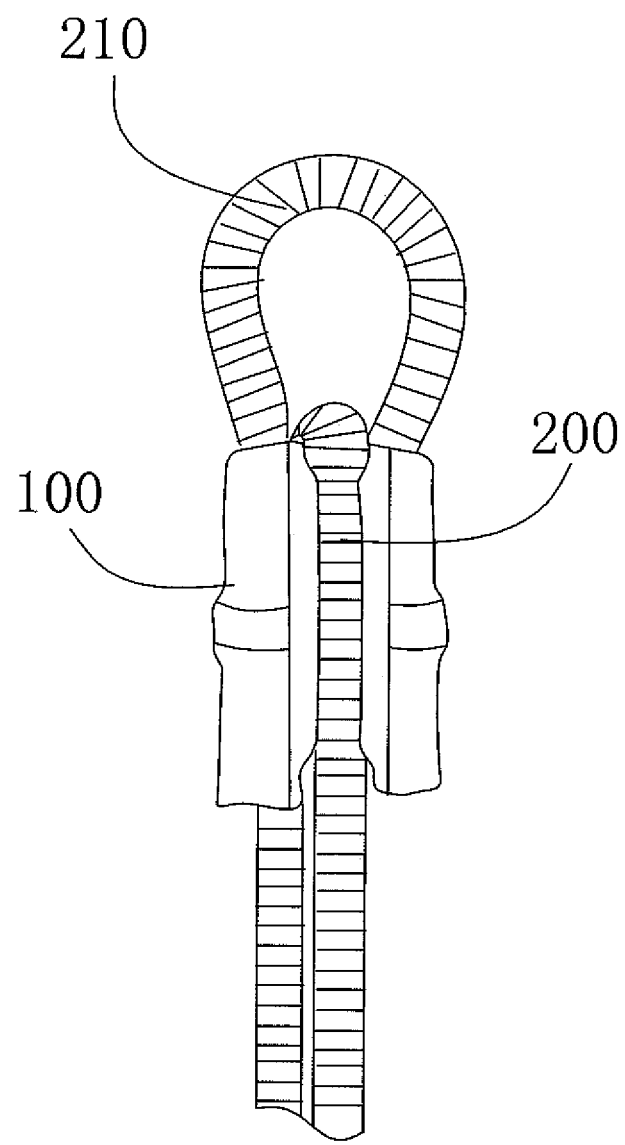
FIG. 3 is a schematic operational view showing usage of the auxiliary rope knotter for a rope.

Referring to FIGS. 1-3, an auxiliary rope knotter 100 in accordance with the preferred embodiment of the present invention comprises an interior formed with a first through hole 10, a second through hole 20, a first locking groove 30 and a second locking groove 40. The first through hole 10, the second through hole 20, the first locking groove 30 and the second locking groove 40 are parallel with each other. In a cross-sectional face of the auxiliary rope knotter 100, the first through hole 10 and the second through hole 20 have a first center connecting line, and the first locking groove 30 and the second locking groove 40 have a second center connecting line. The second center connecting line intersects the first center connecting line.

In the preferred embodiment of the present invention, in a cross-sectional face of the first locking groove 30 and the second locking groove 40, each of the first locking groove 30 and the second locking groove 40 has an opening 103 which has a width "d" smaller than a width "D" of each of the first locking groove 30 and the second locking groove 40. Preferably, the width "D" is the maximum width of each of the first locking groove 30 and the second locking groove 40.

In the preferred embodiment of the present invention, each of the first locking groove 30 and the second locking groove 40 is formed with a first extension wall 101 protruding outward and a second extension wall 102 protruding outward. Tops of the first extension wall 101 and the second extension wall 102 are spaced from each other through a predetermined distance and form the opening 103.

In the preferred embodiment of the present invention, a rope 200 is inserted through the opening 103 into the first locking groove 30 and the second locking groove 40, and the first extension wall 101 and the second extension wall 102 press the rope 200 to increase a friction between the rope 200 and an inner wall of each of the first locking groove 30 and the second locking groove 40. It is appreciated that, the width "d" of the opening 103 of each of the first locking groove 30 and the second locking groove 40 is smaller than the width "D" of each of the first locking groove 30 and the second locking groove 40, such that the rope 200 is, securely locked in the first locking groove 30 and the second locking groove 40.

In the preferred embodiment of the present invention, each of the first locking groove 30 and the second locking groove 40 has two opposite ends each provided with a chamfered face 104. Preferably, the chamfered face 104 has a first extending direction, each of the first locking groove 30 and the second locking groove 40 has a second extending direction, and an angle between the first extending direction and the second extending direction is about 30°-50°.

In the preferred embodiment of the present invention, each of the first through hole 10 and the second through hole 20 has a diameter greater than or equal to that of the rope 200.

In the preferred embodiment of the present invention, the auxiliary rope knotter 100 has an outer surface provided with a projection 105 to enhance a handhold friction so as to increase friction between the auxiliary rope knotter 100 and a user's hand. Preferably, the projection 105 is a rib, a boss or a protruding block.

A rope knotting method of the auxiliary rope knotter 100 comprises a first step of driving the rope 200 to extend through the first through hole 10 and the second through hole 20 serially, and a second step of locking the rope 200, that passes the first through hole 10 and the second through hole 20, into the first locking groove 30 and the second locking groove 40 serially.

In the first step, the rope 200 is formed with a bent portion 210 between the first through hole 10 and the second through hole 20 after the rope 200 serially extends through the first through hole 10 and the second through hole 20.

In the second step, the rope 200, that passes the first through hole 10 or the second through hole 20 is locked between the bent portion 210 of the rope 200 and the auxiliary rope knotter 100.

Accordingly, in the cross-sectional face of the auxiliary rope knotter 100, the first center connecting line formed by the first through hole 10 and the second through hole 20 intersects the second center connecting line formed by the first locking groove 30 and the second locking groove 40, such that the rope 200 is easily knotted by the auxiliary rope knotter 100, thereby facilitating the user operating the auxiliary rope knotter 100 to knot the rope 200, and thereby enhancing the safety of operation. In addition, in the cross-sectional face of the first locking groove 30 and the second locking groove 40, the width "d" of the opening 103 of each of the first locking groove 30 and the second locking groove 40 is smaller than the width "D" of each of the first locking groove 30 and the second locking groove 40, such that the rope 200 is securely locked in the first locking groove 30 and the second locking groove 40. Further, when the rope 200 is inserted through the opening 103 into the first locking groove 30 and the second locking groove 40, the first extension wall 101 and the second extension wall 102 press the rope 200 to increase the friction between the rope 200 and the inner wall of each of the first locking groove 30 and the second locking groove 40, thereby enhancing the structural stability of the auxiliary rope knotter 100. Further, each of the first locking groove 30 and the second locking groove 40 has two opposite ends each provided with a chamfered face 104, such that the rope 200 is inserted into or detached from the first locking groove 30 and the second locking groove 40 easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. An auxiliary rope knotter comprising:
an interior formed with a first through hole, a second through hole, a first locking groove and a second locking groove;
wherein:
the first through hole, the second through hole, the first locking groove and the second locking groove are parallel with each other;
in a cross-sectional face of the auxiliary rope knotter, the first through hole and the second through hole have a first center connecting line, and the first locking groove and the second locking groove have a second center connecting line;
the second center connecting line intersects the first center connecting line;
in a cross-sectional face of the first locking groove and the second locking groove, each of the first locking groove and the second locking groove has an opening which has a width smaller than a width of each of the first locking groove and the second locking groove;
each of the first through hole and the second through hole has a diameter greater than the width of each of the first locking groove and the second locking groove;
each of the first locking groove and the second locking groove is formed with a first extension wall protruding outward and a second extension wall protruding outward;
tops of the first extension wall and the second extension wall are spaced from each other through a predetermined distance and form the opening;

a rope is inserted through the opening into the first locking groove and the second locking groove; and the first extension wall and the second extension wall press the rope to increase a friction between the rope and an inner wall of each of the first locking groove and the second locking groove.

2. The auxiliary rope knotter of claim 1, wherein each of the first locking groove and the second locking groove has two opposite ends each provided with a chamfered face.

3. The auxiliary rope knotter of claim 1, wherein each of the first through hole and the second through hole has a diameter greater than or equal to that of the rope.

4. The auxiliary rope knotter of claim 1, wherein the auxiliary rope knotter has an outer surface provided with a projection to enhance a handhold friction.

5. The auxiliary rope knotter of claim 1, wherein the first locking groove has a C-shaped configuration.

6. The auxiliary rope knotter of claim 1, wherein the second locking groove has a C-shaped configuration.

7. The auxiliary rope knotter of claim 1, wherein the opening is defined between the first extension wall and the second extension wall of each of the first locking groove and the second locking groove.

8. The auxiliary rope knotter of claim 7, wherein the opening extends through a whole length of each of the first extension wall and the second extension wall of each of the first locking groove and the second locking groove.

9. The auxiliary rope knotter of claim 1, wherein the auxiliary rope knotter is formed integrally with the first through hole, the second through hole, the first locking groove, the second locking groove, the first extension wall, and the second extension wall.

10. An auxiliary rope knotter comprising:

an interior formed with a first through hole, a second through hole, a first locking groove and a second locking groove;

wherein:

the first through hole, the second through hole, the first locking groove and the second locking groove are parallel with each other;

in a cross-sectional face of the auxiliary rope knotter, the first through hole and the second through hole have a first center connecting line, and the first locking groove and the second locking groove have a second center connecting line;

the second center connecting line intersects the first center connecting line;

in a cross-sectional face of the first locking groove and the second locking groove, each of the first locking groove and the second locking groove has an opening which has a width smaller than a width of each of the first locking groove and the second locking groove;

each of the first locking groove and the second locking groove is formed with a first extension wall protruding outward and a second extension wall protruding outward;

tops of the first extension wall and the second extension wall are spaced from each other through a predetermined distance and form the opening;

a rope is inserted through the opening into the first locking groove and the second locking groove;

the first extension wall and the second extension wall press the rope to increase a friction between the rope and an inner wall of each of the first locking groove and the second locking groove; and each of the first locking groove and the second locking groove has a length equal to that of each of the first through hole and the second through hole.

11. The auxiliary rope knotter of claim 1, wherein the opening has a length smaller than that of each of the first locking groove and the second locking groove.

12. The auxiliary rope knotter of claim 1, wherein the rope is pressed by the opening.

* * * * *